(12) United States Patent
Barden

(10) Patent No.: US 7,789,129 B1
(45) Date of Patent: Sep. 7, 2010

(54) USER-OPERATED AIR-FLOW ENHANCING DEVICE FOR IMPROVING HEAT DISTRIBUTION FROM AN EXISTING BASEBOARD RADIATOR AND ASSOCIATED METHOD

(76) Inventor: John A. Barden, 15 Talcott Pl., Middletown, NY (US) 10940

( * ) Notice: Subject to any disclaimer, the term of this patent is extended or adjusted under 35 U.S.C. 154(b) by 147 days.

(21) Appl. No.: 12/157,501

(22) Filed: Jun. 11, 2008

(51) Int. Cl.
*F24F 11/04* (2006.01)
*F24H 3/06* (2006.01)

(52) U.S. Cl. .................. 165/244; 165/53; 165/121; 165/122

(58) Field of Classification Search .................. None
See application file for complete search history.

(56) References Cited

U.S. PATENT DOCUMENTS

| | | | | |
|---|---|---|---|---|
| 1,914,812 | A * | 6/1933 | Kresser | 237/78 R |
| 2,808,237 | A * | 10/1957 | Fosnes | 165/122 |
| 3,151,670 | A * | 10/1964 | Kritzer | 165/122 |
| 3,265,859 | A * | 8/1966 | Castello et al. | 165/55 |
| 3,324,938 | A * | 6/1967 | Berkoff | 165/299 |
| 3,768,549 | A * | 10/1973 | Goodie | 165/55 |
| 4,126,268 | A * | 11/1978 | Vitale | 165/122 |
| 4,523,081 | A * | 6/1985 | Geib et al. | 165/123 |
| 5,226,592 | A * | 7/1993 | Turner | 236/49.3 |
| 5,917,699 | A * | 6/1999 | Hung et al. | 361/697 |
| 6,808,018 | B1 * | 10/2004 | Toner | 165/53 |
| 6,990,825 | B2 * | 1/2006 | Hansen | 62/285 |
| 7,088,913 | B1 * | 8/2006 | Verhoorn et al. | 392/360 |

* cited by examiner

*Primary Examiner*—Ljiljana (Lil) V Ciric

(57) ABSTRACT

A user-operated air-flow regulating device includes a radiator enhancer and an enhancer extension situated adjacent to existing radiator fins of an existing baseboard radiator and oriented at an end-to-end pattern. The device further includes a mechanism for directing and displacing ambient air along a first travel path into respective cavities of the radiator enhancer and the enhancer extension. The enhancer extension includes an elongated fan and a coupling attached to one end thereof. Such a coupling is removably conjoined to a portion of the ambient air directing and displacing mechanism such that the ambient air is separately directed along the first travel path and thereafter displaced along the second travel path in each of the radiator enhancer and enhancer extension respectively. The user-operated air-flow regulating device further includes a mechanism for channeling the ambient air along a third travel path leading obliquely away from the second travel path.

17 Claims, 14 Drawing Sheets

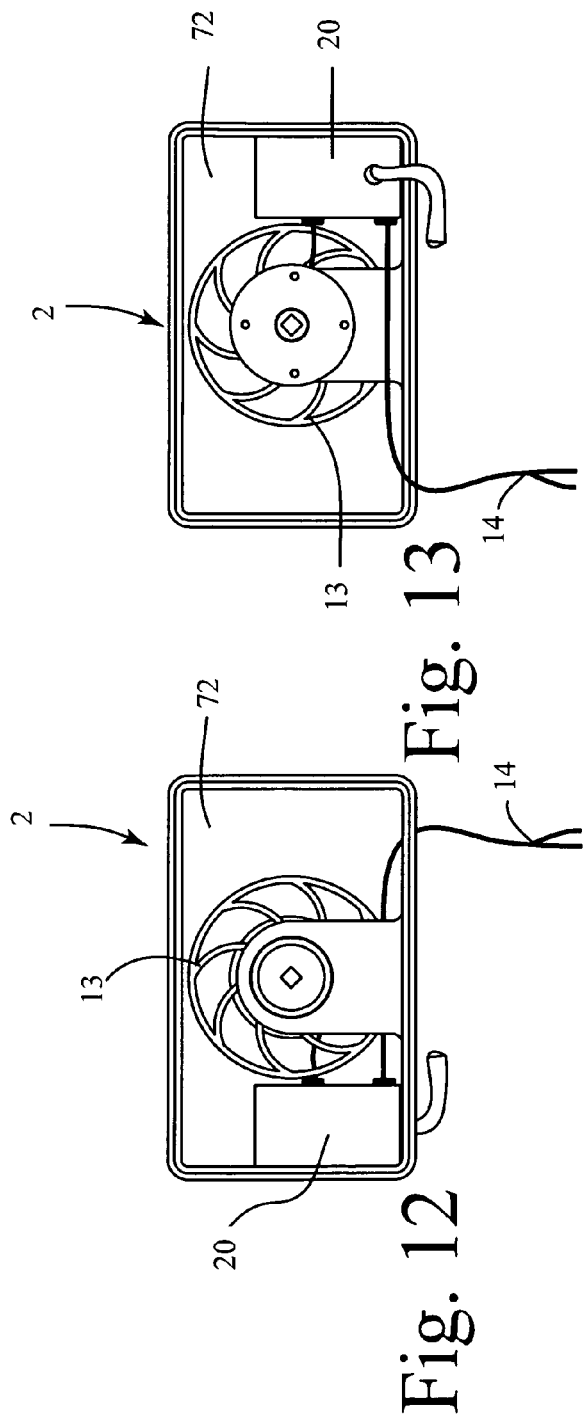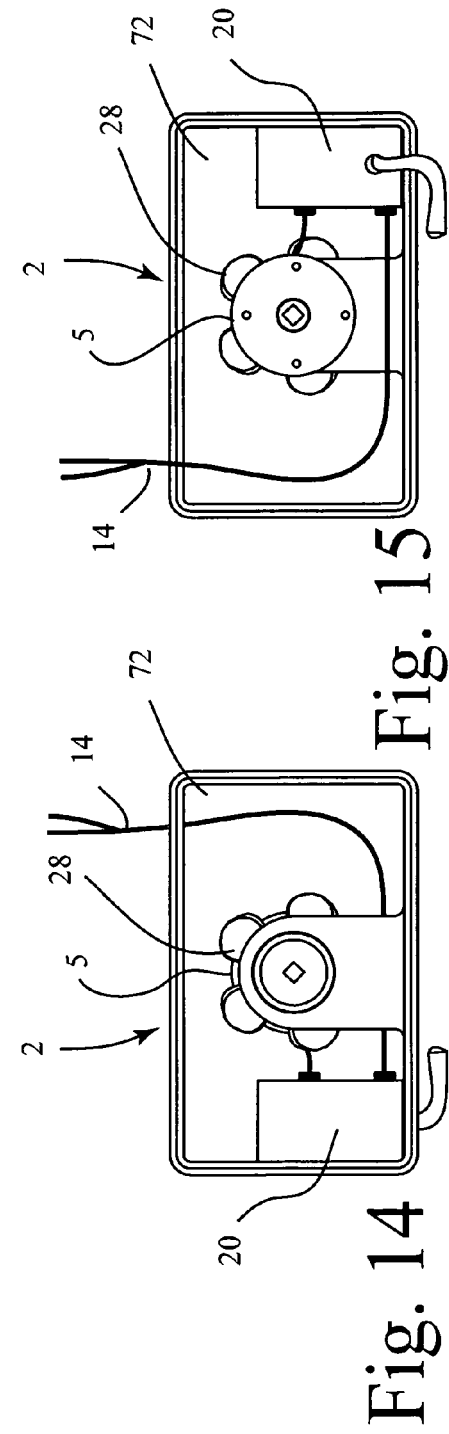

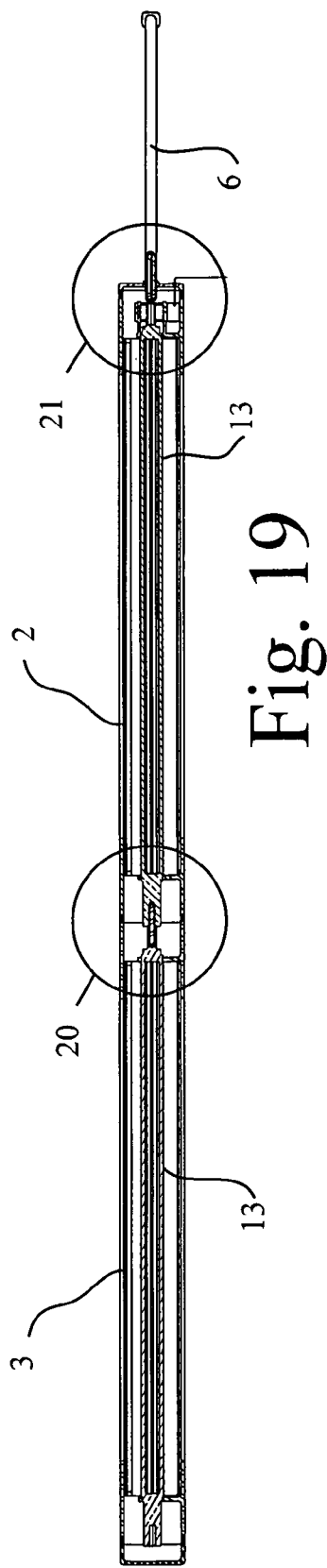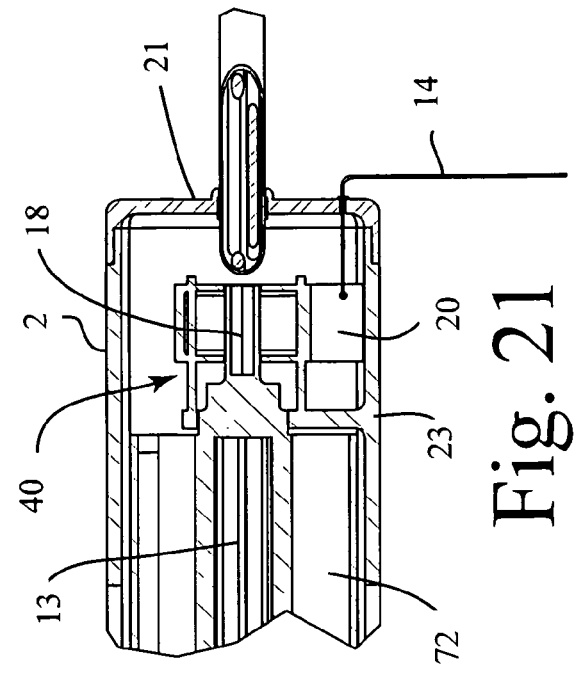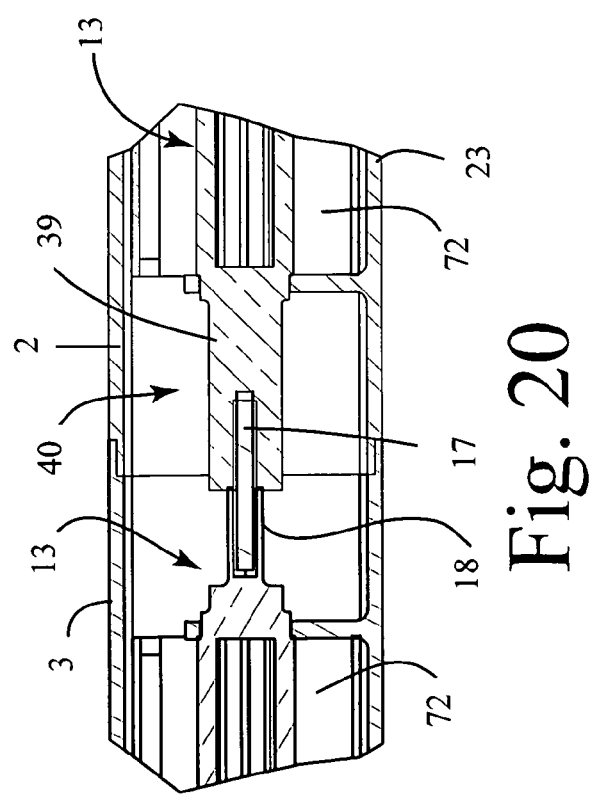

USER-OPERATED AIR-FLOW ENHANCING DEVICE FOR IMPROVING HEAT DISTRIBUTION FROM AN EXISTING BASEBOARD RADIATOR AND ASSOCIATED METHOD

CROSS REFERENCE TO RELATED APPLICATIONS

This application claims the benefit of U.S. Provisional Application No. 60/933,810, filed Jun. 8, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to air-flow enhancing devices and, more particularly, to a user-operated air-flow enhancing device for enhancing heat distribution from an existing baseboard radiator and the like to provide users with a more comfortable and fuel efficient means of heating their homes and officer.

2. Prior Art

It is often necessary, especially during the fall and winter months, to create artificial heat within a home or office building so that persons can comfortably live or perform work related tasks therein. This practice dates as far back as man has been around to the time when cavemen would build fires to generate heat within their caves. For centuries fire was the main source of heat for all homes. The discovery of fuel oil and electricity changed this drastically. Various inventions enabled the consumer to heat their home or office with many types of radiators using steam, hot air, hot water, electricity, etc. Unfortunately, all of these have problems. They are inefficient and unless there is a thermostat in every room, the rooms receive unequal heat. There are also the problems of drafts around the windows and doors and radiators behind furniture.

U.S. Pat. No. 5,917,699 to Hung discloses a heat-radiating device which includes a heat-radiator and a heat conductive rod for contacting with a heat source. The heat-radiator is composed of a heat conductive pipe body integrally formed by extrusion, a heat conductive column co-axially extending in the heat conductive pipe body and multiple heat-radiating vanes radially arranged between an outer periphery of the heat conductive column and an inner periphery of the heat conductive pipe body. The heat conductive rod is connected with the heat conductive column, whereby the column absorbs the heat conducted by the heat conductive rod from the heat source and the heat is spread from the center of the heat conductive column. The distance is shortest so that the heat can be quickly and evenly conducted to the respective vanes and the heat conductive pipe body and then quickly dissipated due to natural convection of air or forced convection by a fan. Unfortunately, this prior art example is not designed for specifically saving energy and lowering energy costs.

U.S. Pat. No. 4,126,268 to Vitale discloses a portable forced air unit having a housing provided with an air driving element arranged between an air inlet and an air outlet. Such an air outlet feeds the forced air beneath a fixed room heat exchanger e.g. baseboard or convector heater with which the unit is designed to operate. Thermostats, responsive to the temperature of the room in which the unit is operating and the temperature of the heat exchanger, serve to control the air driving element. Unfortunately, this prior art example does not accentuate the benefits of any radiator, making living and working conditions more comfortable and constant.

U.S. Pat. No. 6,808,018 to Toner discloses a heat circulation apparatus which includes a housing that has a perimeter wall for defining an interior space. The interior space includes an intake port and an exhaust port. The housing is designed for positioning under the steam radiator. A fan member is rotatably coupled to the housing such that the fan member is positioned in the interior space of the housing. The fan member is for drawing air through the intake port into the interior space of the housing and forcing air out of the interior space of the housing through the exhaust port. The fan member is designed for drawing cooler air into the housing and forcing the air out of the housing to be warmed by the steam radiator when the fan member is rotated with respect to the housing. Unfortunately, this prior art example is not designed to direct the flow of air behind furniture and under windows.

These prior art examples, and various other inventions, enabled the consumer to heat their home or office with many types of radiators using steam, hot air, hot water, electricity, etc. Unfortunately, all of these prior art examples have problems. They are inefficient, and unless there is a thermostat in every room, the rooms receive unequal heat. There are also the problems of drafts around the windows and doors, and radiators behind furniture may provide inadequate heat distribution.

Accordingly, the present invention is disclosed in order to overcome the above noted shortcomings. The air-flow regulating device is convenient and easy to use, lightweight yet durable in design, and designed for enhancing heat distribution from an existing baseboard radiator. The device is simple to use, inexpensive, and designed for many years of repeated use, making living and working conditions more comfortable and affordable.

BRIEF SUMMARY OF THE INVENTION

In view of the foregoing background, it is therefore an object of the present invention to provide an apparatus for enhancing heat distribution from an existing baseboard radiator. These and other objects, features, and advantages of the invention are provided by a user-operated air-flow regulating device.

The typical baseboard radiator relies on the natural flow of air (convection and radiation) over the heating element to heat the room. This is slow and inefficient. The larger the room the less efficient it is, and unless there is a thermostat in every room, the rooms receive unequal heat. There is also the problem of furniture blocking the flow of air and drafts near windows and doors. The present invention addresses each of these problems.

The typical baseboard radiator usually has 2, 3 or even 4 rooms in the zone. The last room in the zone normally gets less heat. The user-operated air-flow device addresses that problem by increasing the air flow in that room. The device, in a preferred embodiment, is controlled completely by the owner and can be linked together to satisfy the requirements of a room. The principle of this type of forced air can be adapted to various heating systems.

The present invention may, in one embodiment, include a rectangular-shaped box that has an intake port and an exhaust port. The present invention also may include a variable speed motor that has a crank shaft connected thereto. Such a crank shaft may have fan blades monolithically formed therewith, which is important for effectively displacing air as the crank shaft rotates. Of course, the present invention may include various types of fans, like a transverse flow blower, as is obvious to a person of ordinary skill in the art.

A control box and a heat sensor may be included because they are essential for allowing an owner to adjust the device to any sequence and duration desired. The variable speed motor can be programmed to activate at the first rise in temperature in the radiator to give a burst of heat, which is vital for effectively decreasing the time it takes to satisfy the thermostat, thus saving fuel.

A predetermined time set by the owner may cause the variable speed motor to turn off, allowing the radiator to continue working as originally designed. As the temperature in the radiator decreases, the variable speed motor can be programmed to turn on again for a short period of time to advantageously and effectively use the latent heat in the radiator, thus saving fuel. An enhancer extension may be directly attached to the radiator enhancer with a coupling device, for increasing the size of the device. An attachment may be installed on the baseboard radiator to effectively direct the flow of air behind furniture and under windows and drafty doors, again saving fuel.

There are three sections to the user-operated air flow enhancer. The first section is the radiator enhancer that is employed out of sight in the baseboard radiator. It is made of a rectangular shaped box with an intake port and an exhaust port. It further includes a sensor, control box and a variable speed motor. The crankshaft is supported by two bearings that hold a fan blade blower or a transverse flow blower depending on whether it sits above or below the radiator fins. There are three types of end caps that are better understood in the drawings. The power source can be AC or battery.

The second section is the enhancer extension that works similarly to the radiator enhancer except that it uses a coupling device which connects the two crankshafts. The coupling device replaces the sensor, control box, variable speed motor and male electric plug. It increases the size of the radiator enhancer at a very low cost.

The third section is the attachment that is employed on the baseboard radiator and includes two side panels and one top panel, for example. The main function of this section is to recoup lost heat behind furniture and reduce the effects of drafts.

In a preferred embodiment, a user-operated air-flow regulating device includes a radiator enhancer and enhancer extension effectively situated adjacent to the existing baseboard radiator and oriented at an end-to-end pattern. Such a radiator enhancer and enhancer extension has a top of the unit and a bottom of the unit removably attached to each other and arranged in such a manner to define a cavity therebetween respectively.

The radiator enhancer includes a mechanism for directing ambient air into the cavity along a first travel path and thereafter displacing the ambient air out from the cavity along a second travel path registered along a mutually exclusive plane to the first travel path. Such an ambient air directing and displacing mechanism is selectively operable based upon a detected heating temperature of the existing radiator fins of the existing baseboard radiator. The enhancer extension conveniently includes an elongated fan and a coupling attached to one end thereof. Such a coupling is removably conjoined to a portion of the ambient air directing and displacing mechanism such that the ambient air is separately and independently directed along the first travel path and thereafter displaced along the second travel path at the enhancer extension.

The ambient air directing and displacing mechanism includes at least one intake port advantageously formed in a wall of the unit of the radiator enhancer, at least one exhaust port formed within another wall of the radiator enhancer, and a fan blade blower rotatably disposed within the cavity of the radiator enhancer and operated in such a manner that the ambient air is separately and independently directed into the radiator enhancer cavity via at least one intake port and thereafter directed out from at least one exhaust port. The ambient air directing and displacing mechanism further includes a control box mounted within the cavity of the radiator enhancer, a variable speed motor seated within the cavity of the radiator enhancer and communicatively coupled to the control box, and a sensor electrically coupled to the control box and extending outwardly from the cavity of the radiator enhancer. Such a sensor adjoins the existing baseboard radiator for detecting a temperature of heat dissipating therefrom.

The ambient air directing and displacing mechanism's fan blade blower includes an elongated rectilinear shaft with axially opposed ends situated at opposed ends of the cavity of the radiator enhancer, and a plurality of bearings fixedly conjoined to the bottom panel and effectively positioned at the opposed ends of the cavity of the radiator enhancer. Each of such bearings has an aperture formed therein, and such apertures are axially aligned with the shaft such that the opposed ends of the shaft penetrate through the apertures while longitudinally oriented within the cavity of the radiator enhancer respectively.

The fan blade blower further includes an end cap and an end cap with two holes removably mated with corresponding ends of the top of the unit and bottom of unit of the radiator enhancer in such a manner that the top of the unit and bottom of unit are prohibited from prematurely separating during operating conditions, and a crank shaft fitted at one of the opposed ends of the shaft and the variable speed motor. Such a crank shaft is rotated in sync with the variable speed motor based upon a control signal received from the control box. The shaft rotates along an arcuate path and thereby draws in the ambient air through the exhaust ports while discharging the ambient air outwardly through the transverse flow blower such that heated air is more efficiently dissipated away from the existing baseboard radiator.

The user-operated air-flow regulating device further includes a mechanism for channeling ambient air along a third travel path leading obliquely away from the radiator fins of the baseboard radiator. Such an ambient air channeling mechanism includes an attachment that has planar front and rear walls contiguously abutted against front and rear walls of the baseboard radiator for cooperating with the deflector to channel ambient air along the third travel path. The attachment is removably positioned over the baseboard radiator wherein an open bottom wall of the attachment is in fluid communication with the radiator fins.

The attachment further includes a top flap connected to a top wall of the attachment. Such a flap is pivotally coupled to the top wall of the attachment for channeling the ambient air upwardly and away from the baseboard radiator and radiator fins. The attachment further includes a plurality of side panels slidably adaptable along respective linear directions defined parallel to a longitudinal length of the baseboard radiator for channeling the ambient air laterally away from opposed ends of the attachment respectively. It is understood that that the third travel path can be identified as either the linear directions of the side panels or the upward direction of the top flap, respectively.

In one embodiment, the radiator enhancer and enhancer extension are seated subjacent to the existing baseboard radiator, and the intake ports are formed in a front wall of the radiator enhancer and enhancer extension. The fan blade blower is used with such an embodiment and is longitudinally oriented beneath a top wall of the radiator enhancer and enhancer extensions, respectively. The front and top walls are advantageously registered perpendicular to each other along mutually exclusive planes such that ambient air is directed along a first travel path and expelled along a second travel path registered orthogonal thereto.

In another embodiment, the radiator enhancer and enhancer extension are seated directly on the existing radiator fins, and the intake ports are formed in a bottom wall of the radiator enhancer and enhancer extension. A transverse flow blower is employed in such an embodiment and is longitudinally extended beneath a top wall of the radiator enhancer and enhancer extension, respectively. The front and top walls are registered parallel to each other along mutually exclusive planes in such an embodiment so that the ambient air is drawn in and lifted vertically therethrough.

The present invention further includes a method for regulating air-flow and enhancing heat distribution from an existing baseboard radiator. Such a method includes the steps of: providing and situating a radiator enhancer and enhancer extension adjacent to the existing baseboard radiator by orienting the radiator enhancer and enhancer extension at an end-to-end pattern. The radiator enhancer and enhancer extension have a top unit and a bottom unit removably attached to each other and arranged in such a manner to define a cavity therebetween respectively. The method further includes the steps of separately and independently directing ambient air into the radiator enhancer and enhancer extension cavities such that the ambient air travels along a first travel path respectively; and separately and independently displacing the ambient air out from the radiator enhancer and enhancer extension along a second travel path that is registered along a mutually exclusive plane to the first travel path, respectively, based upon a detected heating temperature of the existing baseboard radiator.

The method may further include the steps of: providing at least one intake port formed in a front wall of the radiator enhancer; providing at least one exhaust port formed within another wall of the radiator enhancer; providing and mounting a control box within the radiator enhancer cavity; providing and seating a variable speed motor within the radiator enhancer cavity; communicatively coupling the variable speed motor to the control box; providing and electrically coupling a sensor to the control box by extending the sensor outwardly from the cavity; adjoining the sensor to the existing radiator fins for detecting a temperature of heat dissipating therefrom; separately and independently directing the ambient air into the radiator enhancer and enhancer extension cavities via at least one intake port and thereafter separately and independently directing the ambient air out from at least one exhaust port, respectively, by providing and rotatably disposing a fan within the radiator enhancer cavity.

The method may further include the step of channeling the ambient air along a third travel path leading obliquely away from the second travel path by: providing an attachment having planar front and rear walls contiguously abutted against front and rear walls of the baseboard radiator for cooperating with the deflector to channel ambient air along the third travel path; removably positioning the attachment over the existing baseboard radiator wherein an open bottom wall of the attachment is in fluid communication with the existing radiator fins; channeling the ambient air upwardly and away from the radiator fins by providing and pivotally coupling a top flap to a top wall of the attachment; and channeling the ambient air laterally away from the ends of the attachment by providing and slidably adapting a plurality of side panels along respective linear directions defined parallel to a longitudinal length of the front wall of the attachment.

In a preferred embodiment, the method may include the steps of: positioning the radiator enhancer and enhancer extension subjacent to the existing baseboard radiator. The intake ports are formed in a front wall of the radiator enhancer and enhancer extension. In such an embodiment, the fan blade blower is longitudinally oriented beneath a top wall of the radiator enhancer and enhancer extension. The front and top walls are registered perpendicular to each other along mutually exclusive planes.

The method may further include the steps of: positioning the radiator enhancer and enhancer extension directly on the existing baseboard radiator. The intake ports are formed in bottom and top walls of the radiator enhancer and enhancer extension. Such an embodiment employs a transverse flow blower that is longitudinally oriented beneath the top wall of the radiator enhancer and enhancer extension. The bottom and top walls are registered parallel to each other along mutually exclusive planes for separately and independently directing the ambient air upwardly along a substantially vertical direction.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGS. 12 and 13 are front and rear elevational views of the radiator enhancer shown in FIG. 10, respectively;

FIGS. 14 and 15 are front and rear elevational views of the radiator enhancer shown in FIG. 8, respectively;

FIGS. 19-21 are various cross-sectional views showing the interrelationship between the coupling and the respective fans of the radiator enhancer and enhancer extension as well as the interrelationship between the control box, variable speed motor and sensor of the radiator enhancer.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The air-flow enhancing device 100 of this invention is referred to generally in FIGS. 1-21 and is intended to provide a user-operated air-flow device. It should be understood that the device 100 may be used to enhance many different types of air-flow systems and should not be limited to enhancing only those types of baseboard radiators mentioned herein.

Figure 1:
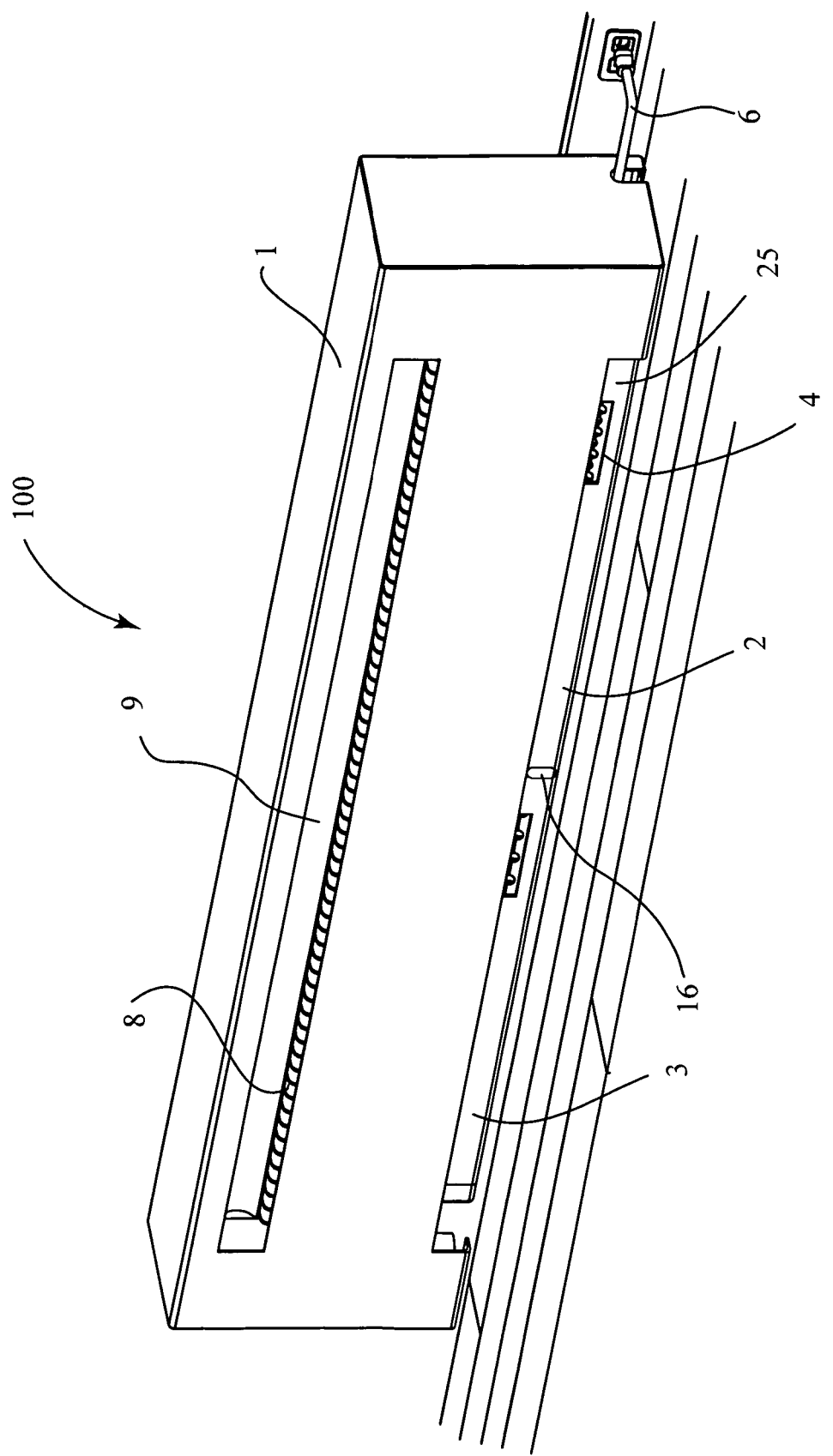
FIG. 1 is a perspective view showing one embodiment of the present invention that employs a radiator enhancer and enhancer extension that separately and independently diverts air flow along first and second travel paths, in accordance with the present invention.

FIG. 1 is a perspective view of a baseboard radiator 1 that employs a radiator enhancer 2 and an enhancer extension 3. All power is derived by a male electric plug 6 but can be adapted to battery, as well understood by one skilled in the art. The sensor 14 detects a rise in temperature in the radiator fins 8 approaching the preset temperature set by the user at the control box 20. The control box 20 will start the variable speed motor 19 by turning the crankshaft 18 and the fan blade blower 5 at a predetermined speed and duration set by the user in the control box 20, thereby causing the room temperature air to flow into the intake port 4, through the fan blade blower 5 and out the exhaust port 7. The room temperature air is forced through the radiator fins 8 onto the deflector 9 and into the room.

FIG. 1 does not show the interior components of the present invention, however, such components are shown in FIGS. 6 through 21. The embodiment of FIG. 1 is preferably used in an area where the user wants to increase the flow of hot air into a room for a short period of time to satisfy the thermostat, thereby saving fuel. The average thermostat works on a two degree differential. If the user increases the hot air flow for a short period of time and then stops and lets the baseboard radiator 1 work as designed, he will shorten the time it takes to satisfy the thermostat; thereby saving fuel. The user may also set the control box 20 to go on for a few seconds as the temperature in the radiator fins 8 decreases, thereby taking advantage of the latent heat in the radiator fins 8, again saving fuel.

The embodiment shown in FIG. 1 can also be used near drafty doors by setting the control box 20 to run continuously when there is heat in the radiator fins 8, thereby reducing the effect of the draft and saving fuel.

Figure 2:
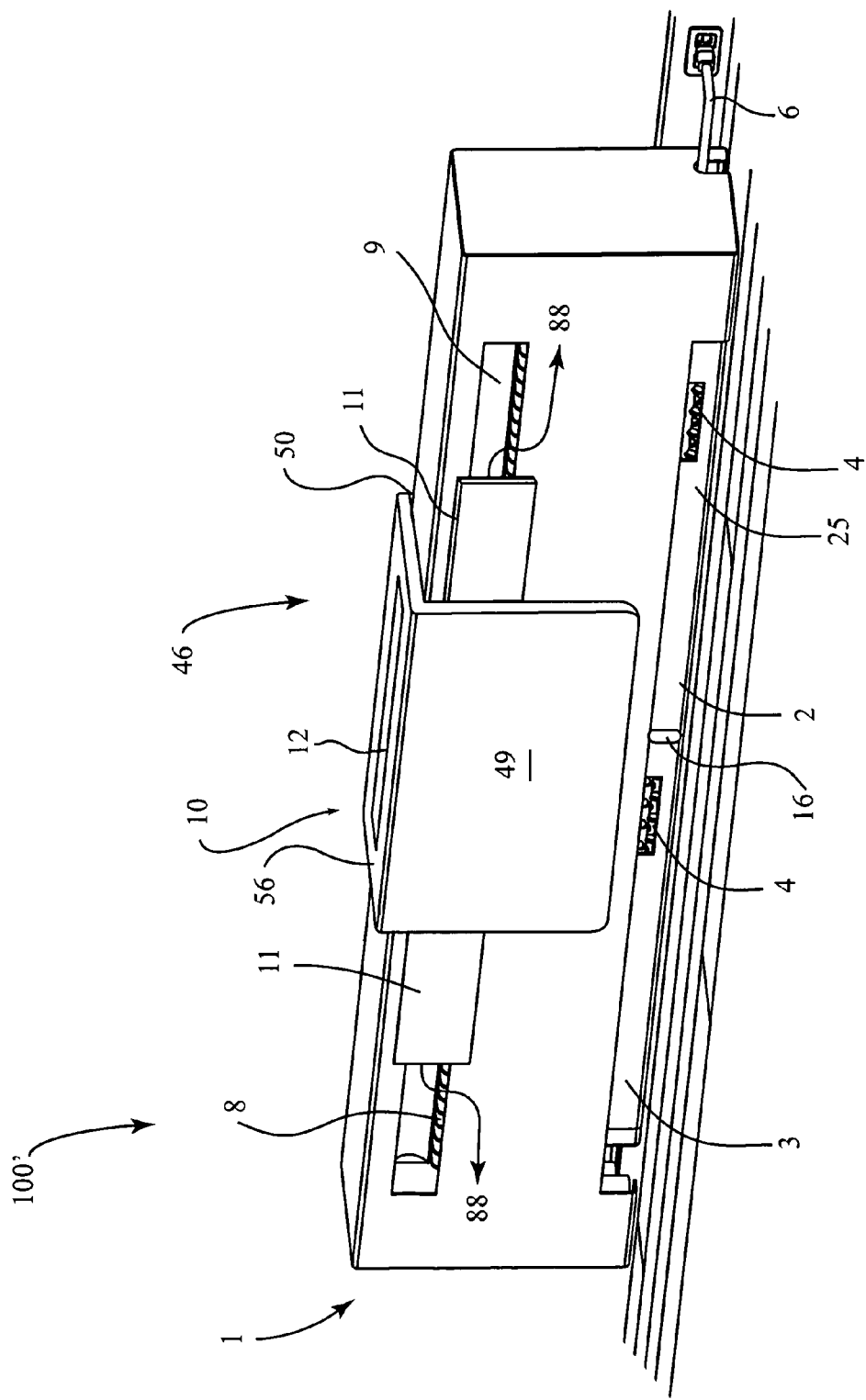
FIG. 2 is a perspective view showing another embodiment of the present invention that employs a radiator enhancer and enhancer extension in combination with an attachment that diverts air-flow along at least a third travel path, in accordance with the present invention.

FIG. 2 is a perspective view of one embodiment of the radiator enhancer 2, an enhancer extension 3 and an attachment 10. The attachment 10 preferably includes a front wall 49 and a top wall 56 intermediately formed therebetween. Such walls 49 and 56 define open sides at the attachment 10. This embodiment works the same as FIG. 1 until the hot air hits the deflector 9 where it is forced into the attachment 10 and out from the side panel 11. Such an embodiment is preferably intended for use behind tall furniture such as china closets, thereby forcing the wasted hot air into the room and saving fuel.

Figure 3:
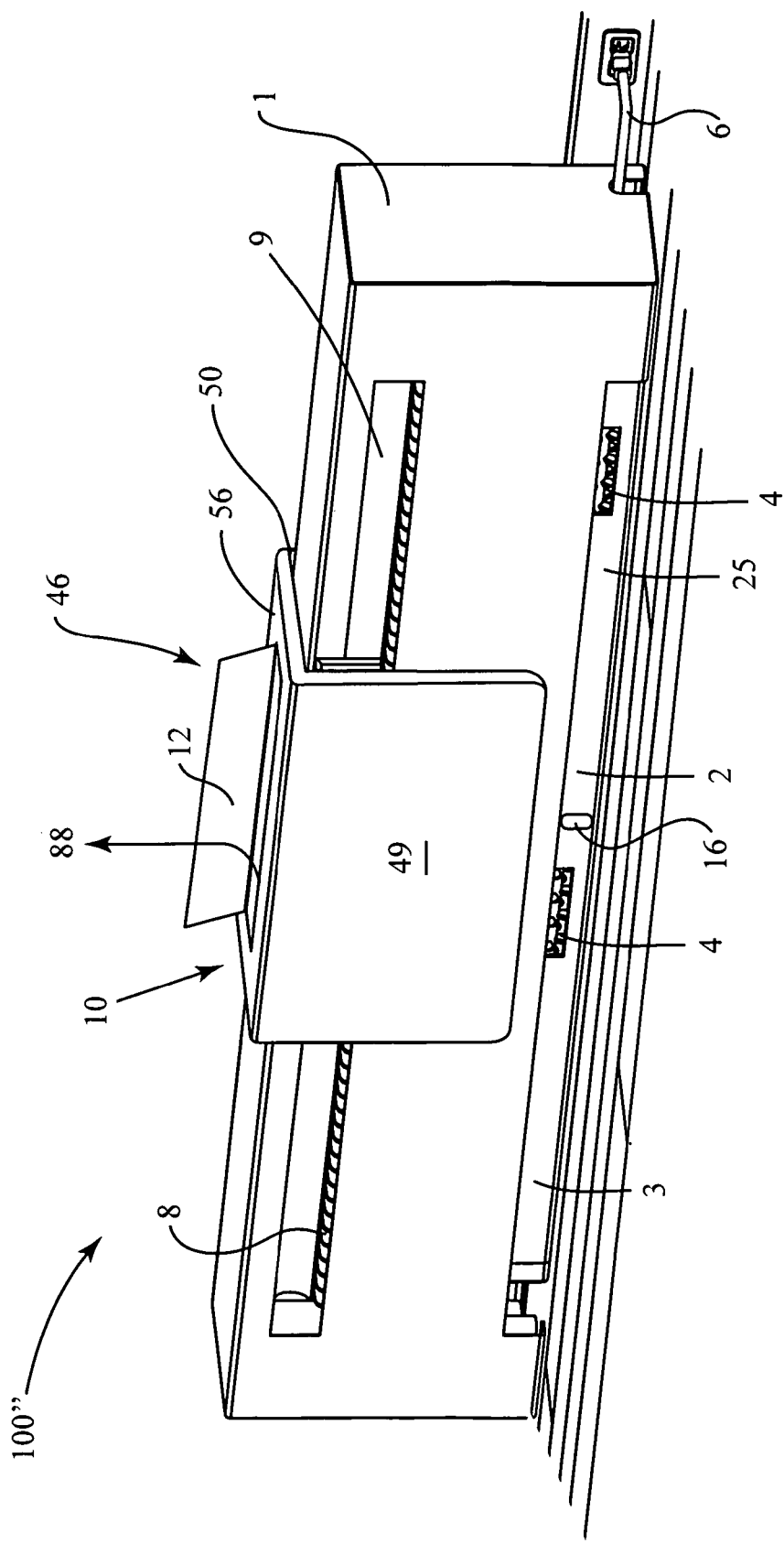
FIG. 3 is a perspective view showing yet another embodiment of the present invention that employs a radiator enhancer and enhancer extension in combination with an attachment that diverts air-flow along at least another third travel path, in accordance with the present invention.

The embodiment of FIG. 3 is the same view as the embodiment in FIG. 2 except the attachment 10 has top flap 12 pivotally attached to the top wall 56 wherein the top flap 12 is pivotal between open and closed positions. Also, such an embodiment has closed sides abutted against the front wall of the baseboard radiator 1. In order to do this, the user will cut the deflector 9 and a small portion of the baseboard radiator 1 to allow the top flap 12 to close. This will ensure the flow of air through the side panel 11 and top flap 12. FIG. 3 can be used behind low furniture, such as couches, forcing the hot air into the room. It can also be used under windows for combating the effects of draft.

Figure 4:
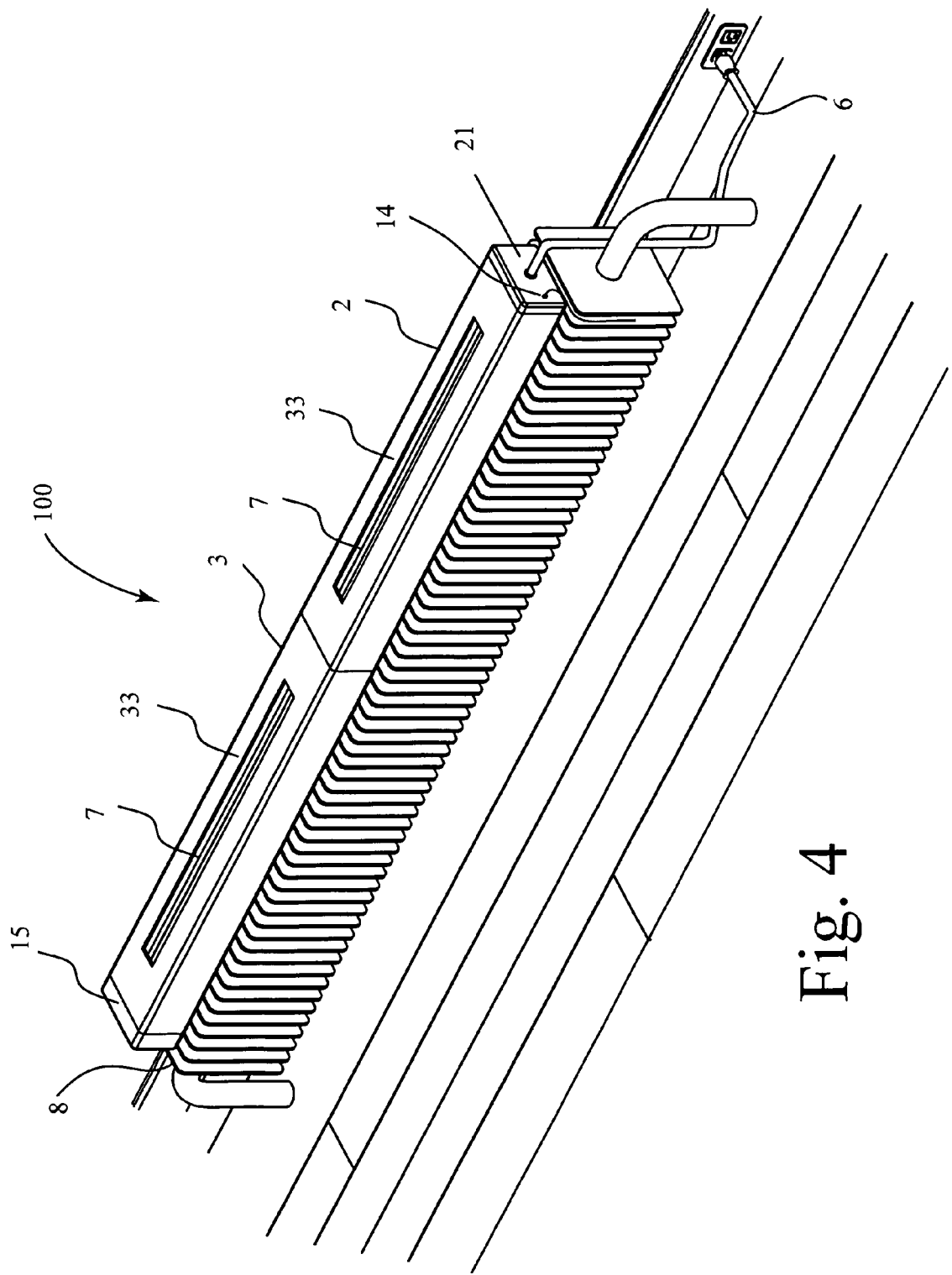
FIG. 4 is a perspective view showing yet another embodiment of the present invention that employs a radiator enhancer and enhancer extension positioned on top of an existing baseboard radiator.

FIG. 4 is a perspective view showing the radiator enhancer 2 and an enhancer extension 3 resting on top of the radiator fins 8, connected by a coupling device 17 (shown in FIG. 6) through an end cap with a center hole 16 (shown in FIGS. 1-3, 5). It also shows the male electric plug 6, the sensor 14, end cap 21 with holes attached to opposed ends of the radiator enhancer 2, exhaust ports 7 (equal in size to the intake ports shown in FIGS. 10, 11, 16 and 18), the transverse flow blower 13 and the end cap 15. This device 100 is preferably used in an area where the radiator enhancer 2 and the enhancer extension 3 will not fit under the radiator fins 8.

Figure 5:
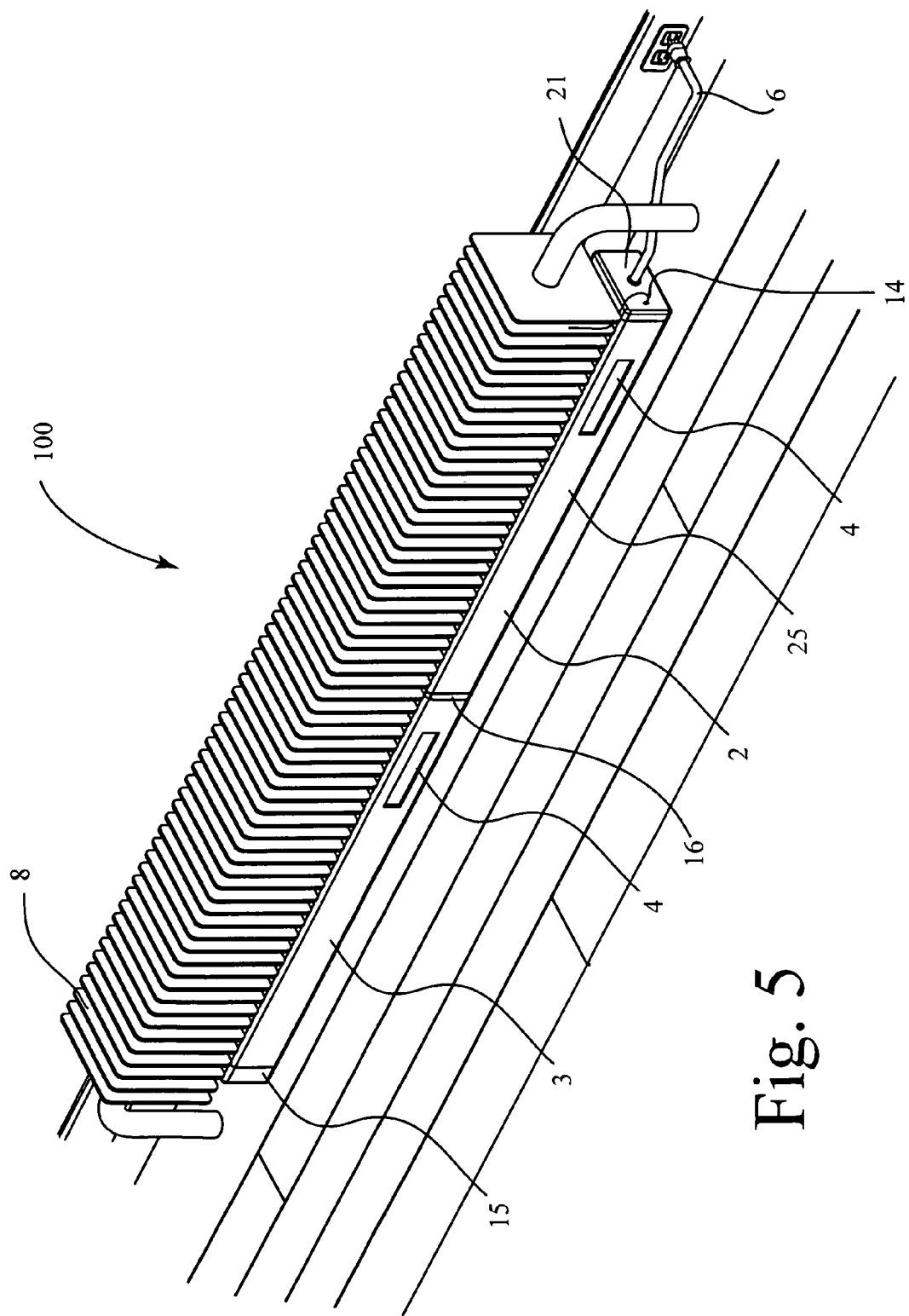
FIG. 5 is a perspective view showing yet another embodiment of the present invention that employs a radiator enhancer and enhancer extension positioned beneath an existing baseboard radiator.

FIG. 5 is the same view as FIG. 4 except it employs the fan blade blower 5 and rests under the radiator fins 8. The intake ports 4 are shown and are equal in square inches to the exhaust ports 7 (shown in FIGS. 6, 8 and 9).

Figure 6:
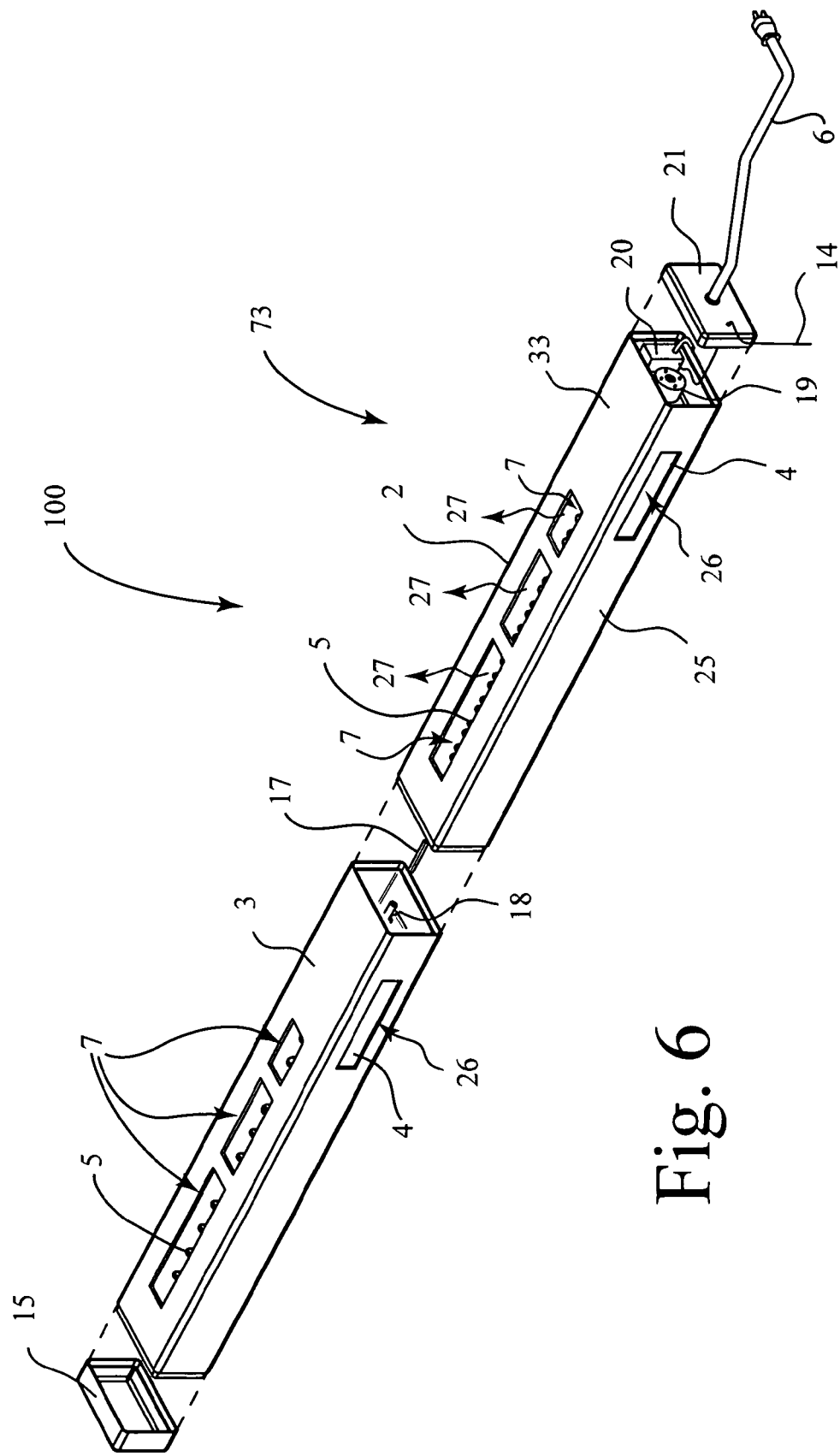
FIG. 6 is an exploded view showing the radiator enhancer and enhancer extension separated along an end-to-end pattern in one embodiment of the present invention.

FIG. 6 is an exploded view of the radiator enhancer 2 and the enhancer extension 3, in accordance with one embodiment of the present invention. Shown in this view are the male electric plug 6, sensor 14, end cap with holes 21, control box 20, variable speed motor 19, intake ports 4, and exhaust ports 7. It is noted that the radiator enhancer 2 and enhancer extension 3 may be connected together via an end cap with a center hole 16 (shown in FIGS. 1-3). FIG. 6 further shows a coupling device 17, crankshaft 18 and end cap 15.

The embodiment of FIG. 6 receives its power through the male electric plug 6. The sensor 14 alerts the control box 20 when the preset temperature in the radiator fins 8 is reached starting the variable speed motor 19 and turning the fan blade blower 5 at a preset speed and duration set in the control box 20. Room temperature air is drawn in through the intake ports 4, forced through the exhaust ports 7.

Figure 7:
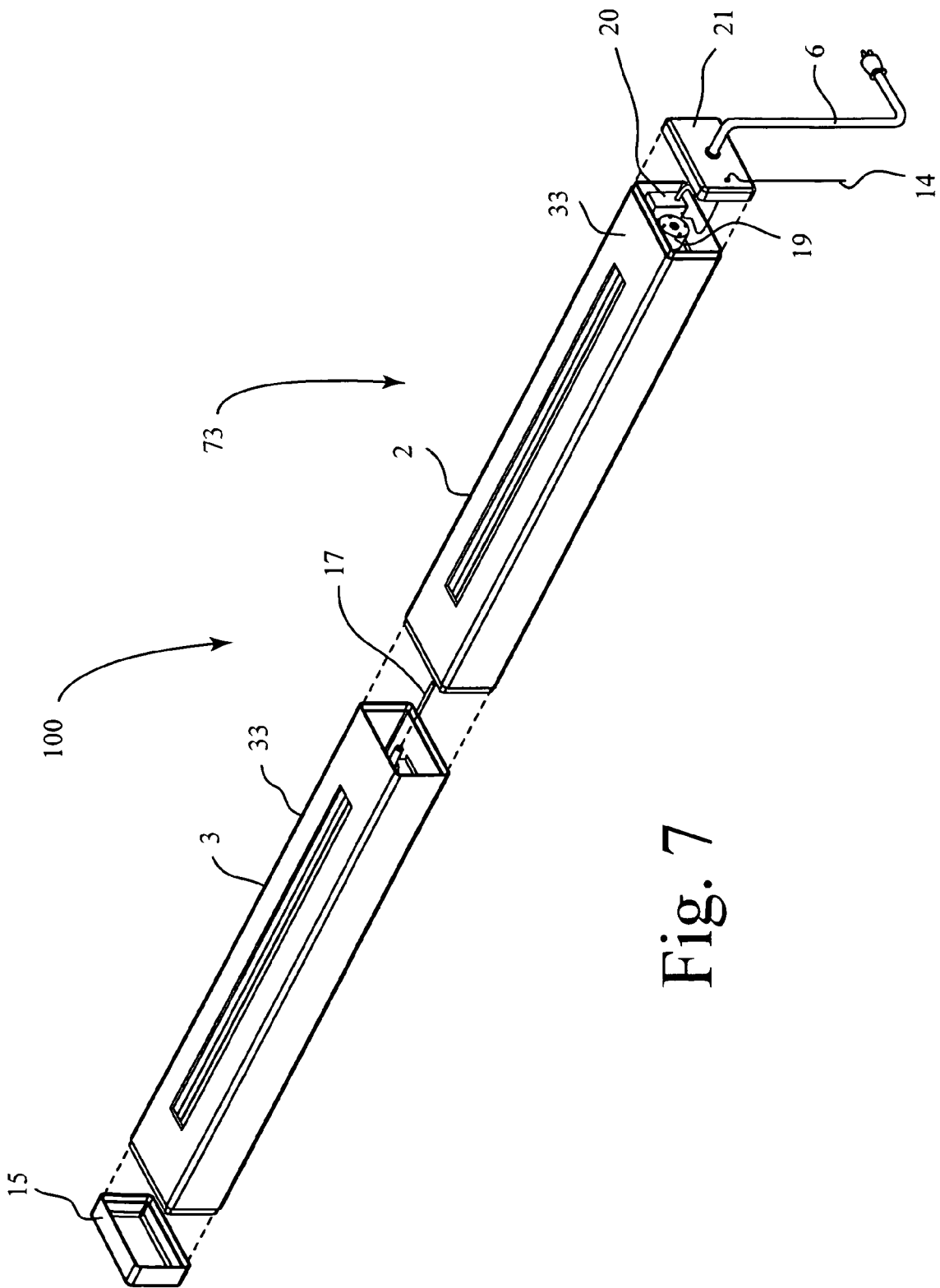
FIG. 7 is an exploded view showing the radiator enhancer and enhancer extension separated along an end-to-end pattern in another embodiment of the present invention.

FIG. 7 is the same view as FIG. 6 except such an embodiment employs the transverse flow blower 13 (best shown in FIGS. 10-13 and 16-21). Hot air is drawn from the radiator fins 8 into the intake ports 4 formed at the bottom wall of unit 23.

Figure 8:
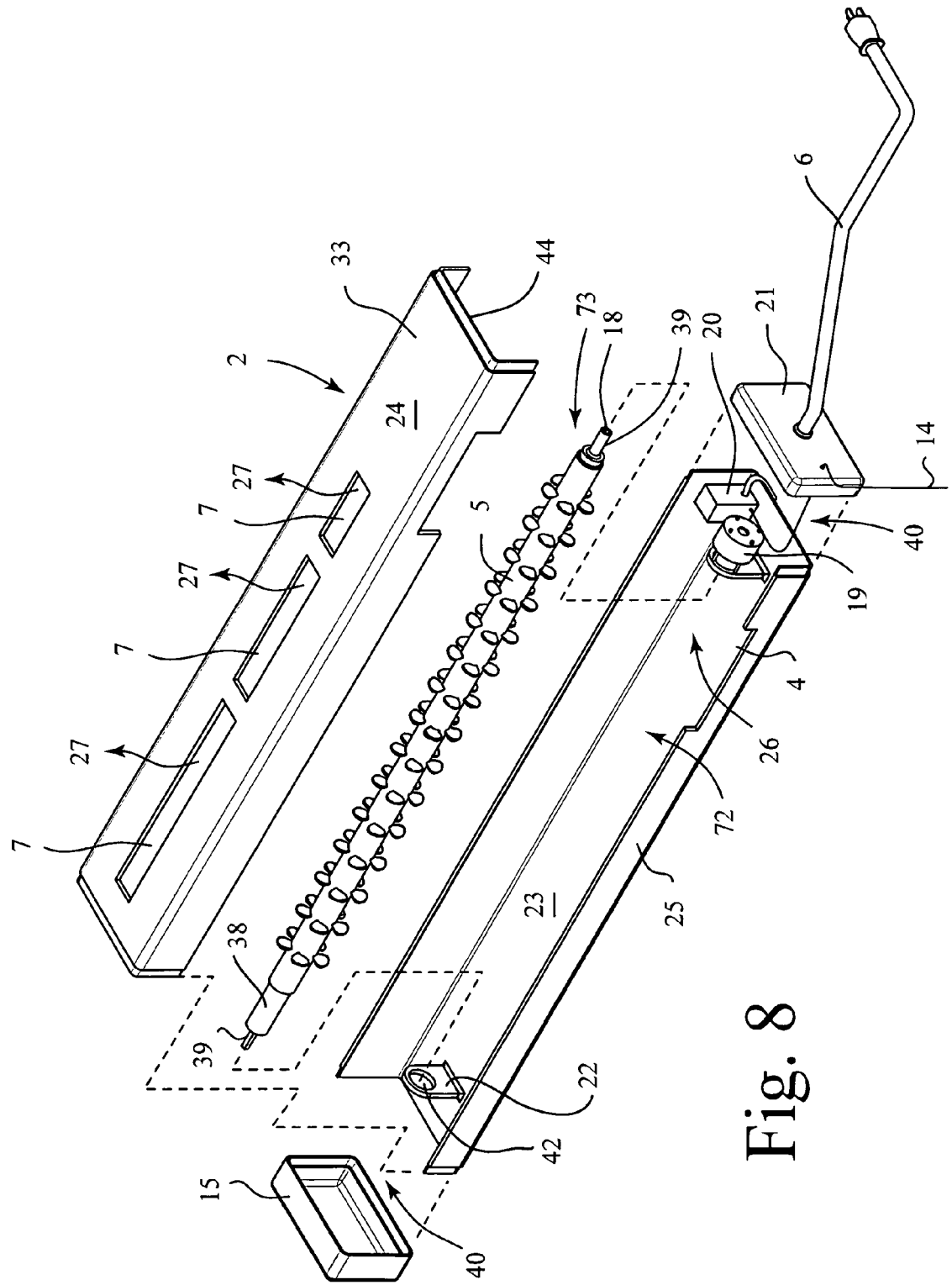
FIG. 8 is an exploded view showing internal components of the radiator enhancer in accordance with one embodiment of the present invention.
Figure 9:
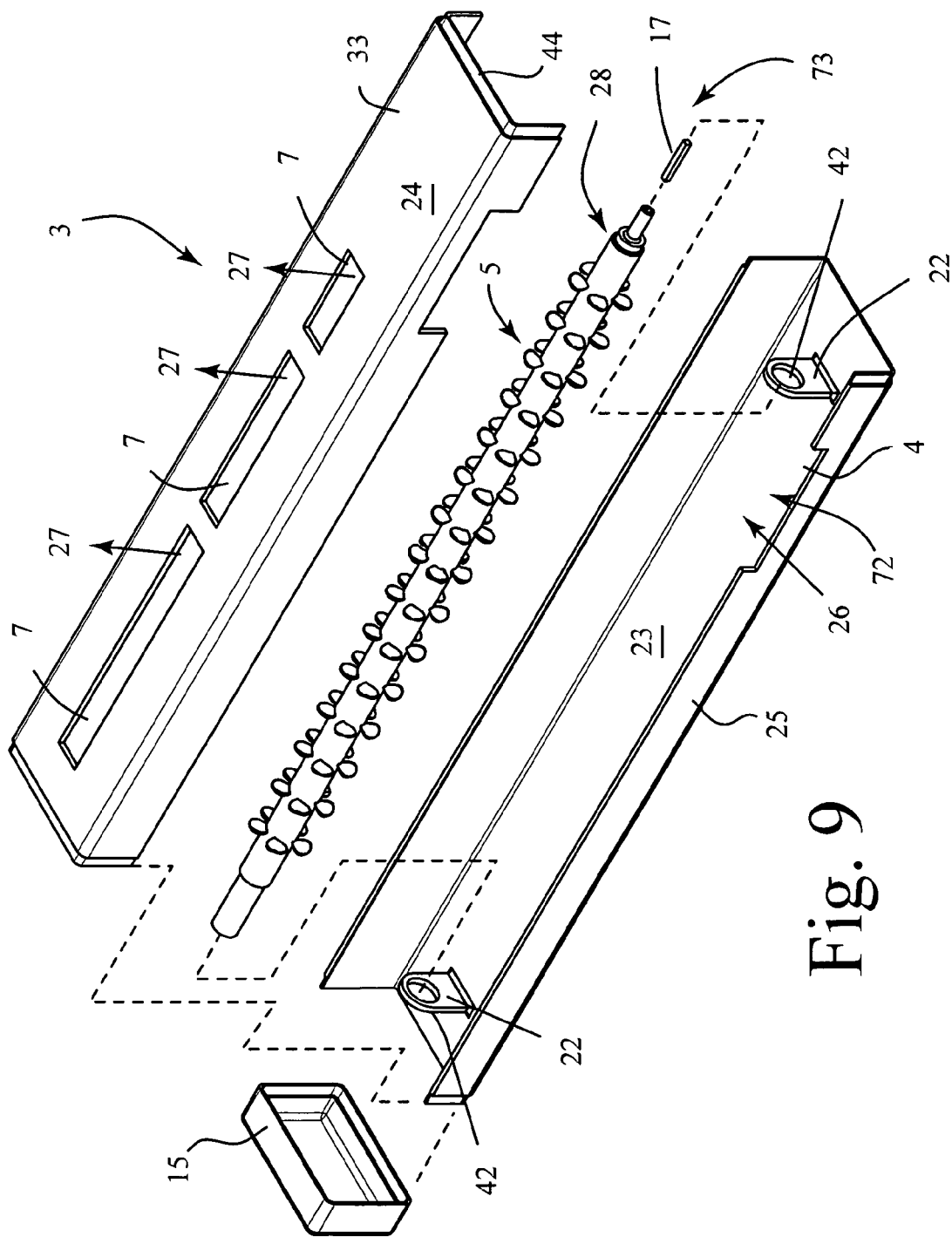
FIG. 9 is an exploded view showing internal components of the enhancer extension in accordance with different embodiments of the present invention.

FIG. 8 is an exploded view of a radiator enhancer 2 using a fan blade blower 5. This is the basic unit and it employs a male electric plug 6 that goes through the end cap 21 with holes connected to the control box 20. The sensor 14 also goes through the end cap 21 with holes and connects to the control box 20. The sensor 14 feels the temperature increase in the radiator fins 8 and notifies the control box 20 to start the variable speed motor 19 at a predetermined speed and duration set by the user. The variable speed motor 19 turns the crankshaft 18, which sits on two brackets 22 for turning the fan blade blower 5 and thereby drawing room temperature into the intake port 4 and out the exhaust ports 7. Also shown is the end cap 15. The exhaust ports 7 shows that although there are three ports, their combined square inches are equal to the square inches of the intake port 4. This insures an equal flow of air throughout the range of the radiator enhancer 2.

The various components of the present invention 100 provide many advantages over the prior art examples. The present invention 100 is user friendly and can be adjusted for many needs. It is easily manufactured, saves fuel and enhances the comfort of a room. Further, the air-flow regulating device 100 provides the unexpected benefit of increasing the size of the device with fewer components than the prior art examples and is thereby extremely inexpensive to manufacture.

The present invention 100 further recoups wasted heat behind furniture, thereby reducing the effects of drafts under windows and near doors. Various components of the present invention 100 are employed inside the baseboard radiator 1 and are not visible to onlookers. The present invention, although employed on the baseboard radiator 1, is simple and attractive. It is normally used behind furniture and cannot be seen except when used near drafty doors. Also, since the average thermostat works on a two degree differential, if the user increases the hot air flow for a short period of time and then stops and lets the baseboard radiator 1 work as designed, he will shorten the time it takes to satisfy the thermostat, thereby saving fuel.

Referring to FIGS. 1-21, a user-operated air-flow regulating device 100 includes a radiator enhancer 2 and enhancer extension 3 situated adjacent to the existing baseboard radiator 1 and oriented at an end-to-end pattern. Such a radiator enhancer 2 and enhancer extension 3 have top and bottom units 24, 23 removably attached to each other and arranged in such a manner to define a cavity 72 therebetween respectively.

Referring to FIGS. 1-21, the device 100 preferably includes a radiator enhancer 2 and a mechanism 73 for directing and displacing ambient air into a cavity 72 along a first travel path 26 and thereafter displacing the ambient air out from the cavity 72 along a second travel path 27 that is registered along a mutually exclusive plane to the first travel path 26. Such an ambient air directing and displacing mechanism 73 is selectively operable based upon a detected heating temperature of the existing baseboard radiator 1.

In one embodiment, the device 100 may further include an enhancer extension 3 that includes an elongated fan 28 and a coupling 17 attached to one end thereof. Such a coupling 17 is removably conjoined to a portion of the ambient air directing and displacing mechanism 73 which is essential such that the ambient air is separately and independently directed along the first travel path 26 and thereafter displaced along the second travel path 27 at the enhancer extension 3 as well as the radiator enhancer 2, for example.

In one embodiment, the ambient air directing and displacing mechanism 73 includes at least one intake port 4 formed in a wall 25 of the radiator enhancer 2 and/or enhancer extension 3, as best shown in FIGS. 1-3, 5-6, 8-9 and 16-18. Mechanism 73 further includes at least one exhaust port 7 formed within another wall 33 of the radiator enhancer 2 and/or enhancer extension 3, and a fan blade blower 5 rotatably disposed within the cavity 72 of the radiator enhancer 2 and/or enhancer extension 3 and operated in such a manner that the ambient air is separately and independently directed into the radiator enhancer 2 and/or enhancer extension 3 cavity via at least one intake port 4 and thereafter directed out from the at least one exhaust port 7. The ambient air directing and displacing mechanism 73 further includes a control box 20 mounted within the cavity 72 of the radiator enhancer 2, a variable speed motor 19 seated within the cavity 72 of the radiator enhancer 2 and communicatively coupled to the control box 20, and a sensor 14 electrically coupled to the control box 20 and extending outwardly from the cavity 72 of the radiator enhancer 2. Such a sensor 14 adjoins the existing radiator fins 8 for detecting a temperature of heat dissipating therefrom, as best shown in FIG. 5.

With respect to the radiator enhancer 2, the ambient air directing and displacing mechanism's fan blade blower 5 includes an elongated rectilinear shaft 38 with axially opposed ends 39 situated at opposed ends 40 of the cavity 72 of the radiator enhancer 2, and a plurality of bearings 22 fixedly conjoined to the bottom panel 23 and positioned at the opposed ends 40 of the cavity 72 of the radiator enhancer 2. Each bracket 22 has an aperture 42 formed therein and such apertures 42 are axially aligned with the shaft 38 which is important such that the opposed ends 39 of the shaft 38 penetrate through the apertures 42 while longitudinally oriented within the cavity 72 of the radiator enhancer 2 respectively.

A plurality of end caps 15, 16, 21 with holes are removably mated with corresponding ends of top and bottom units 24, 23 of the radiator enhancer 2 in such a manner that the top and bottom units 24, 23 are prohibited from prematurely separating during operating conditions. Of course, as understood by one skilled in the art, the enhancer extension 3 may also include any and all of the above-mentioned components, in an alternate embodiment of the present invention without departing from the true scope of the present invention.

Figure 10:
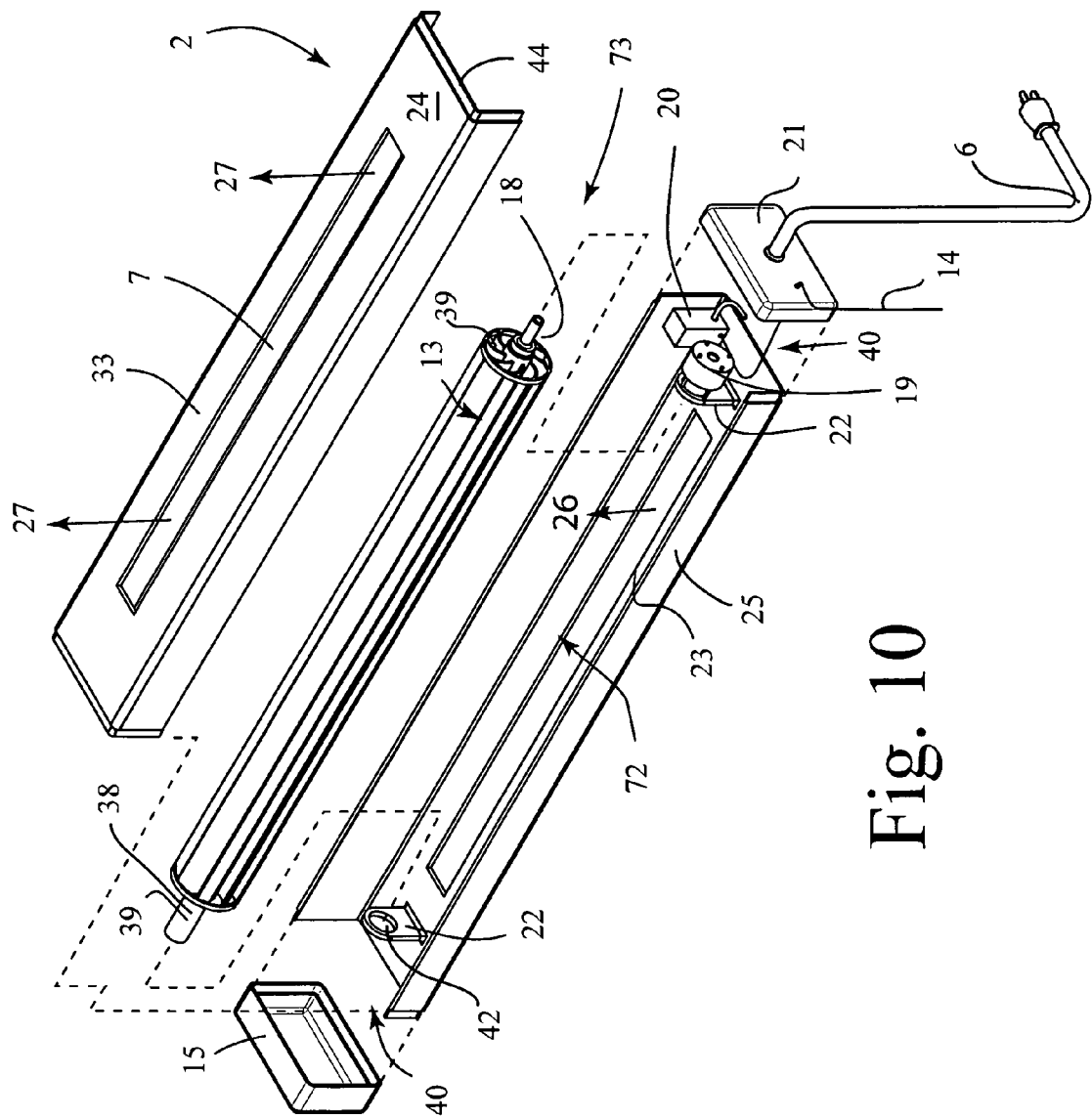
FIG. 10 is an exploded view of a radiator enhancer with a transverse flow blower.
Figure 11:
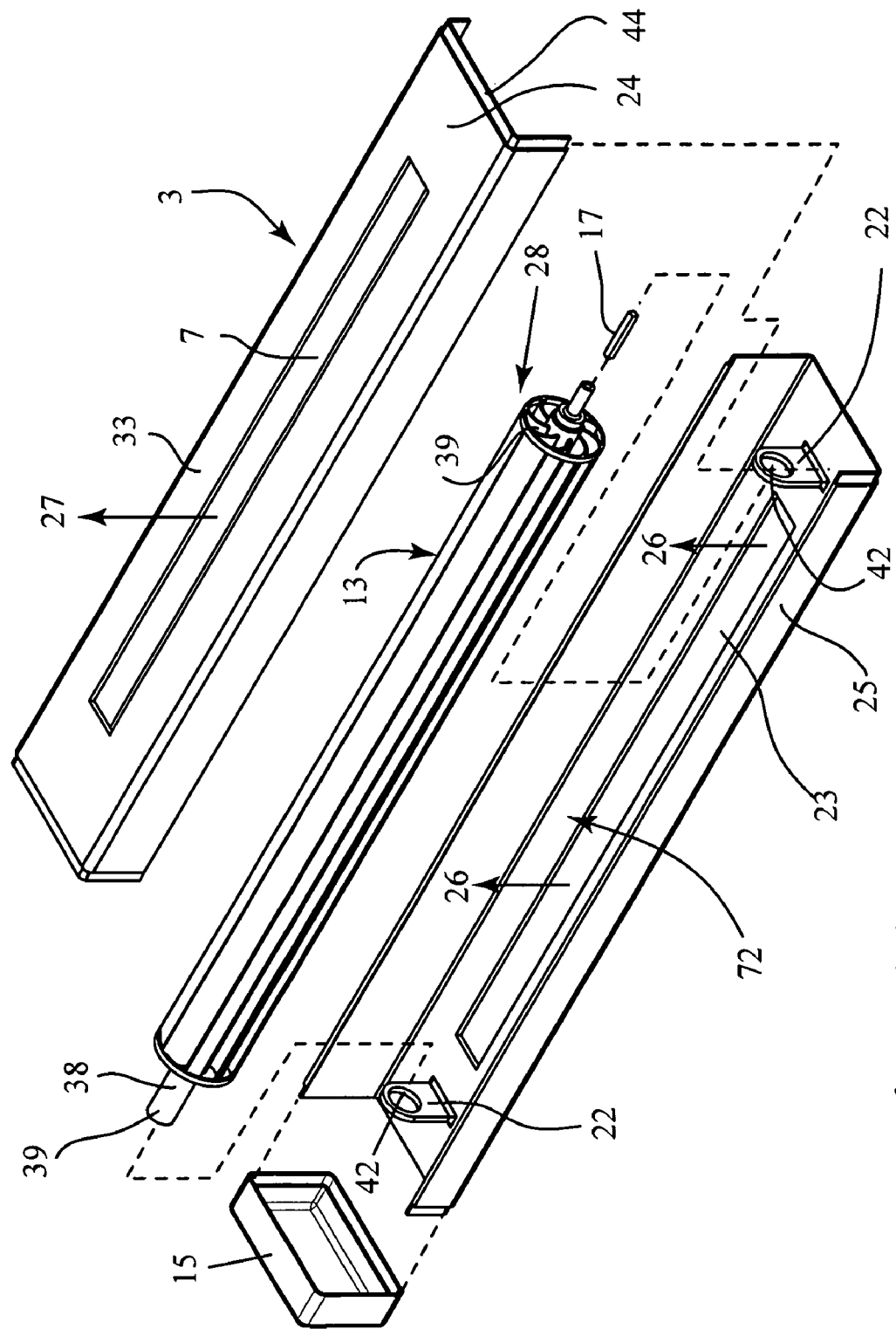
FIG. 11 is an exploded view of an enhancer extension with a transverse flow blower that is connectable to the transverse flow blower of the radiator enhancer.
Figure 16:
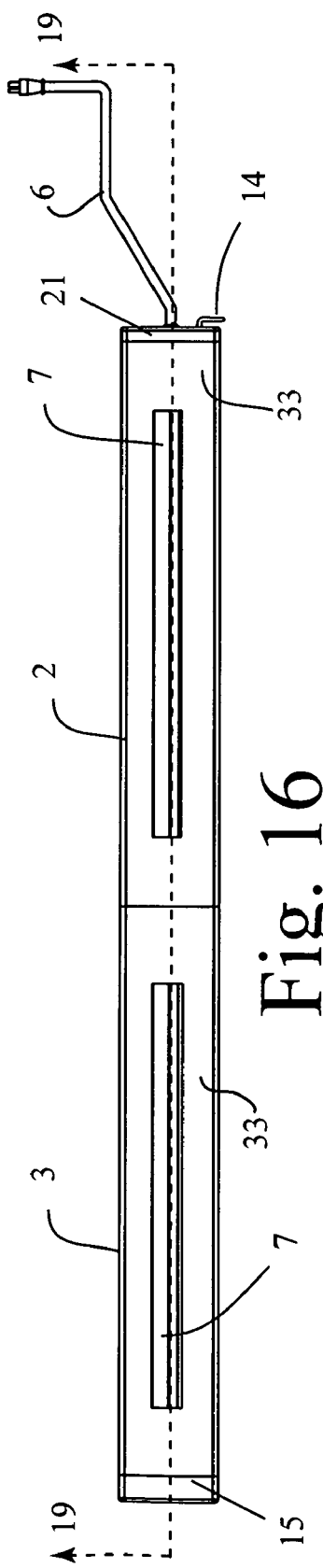
FIGS. 16-18 are various elevational views showing the radiator enhancer and enhancer extension positioned at an end-to-end pattern, in accordance with the embodiment shown in FIGS. 4, 7 and 10.
Figure 17:
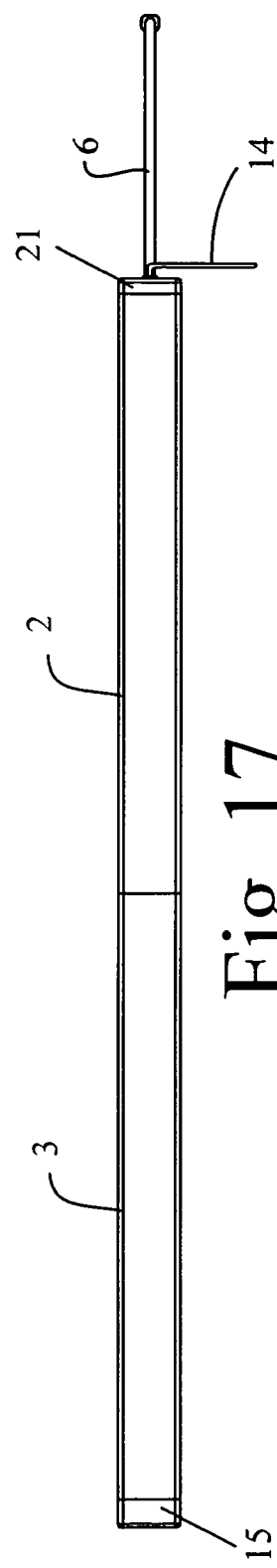
Figure 18:
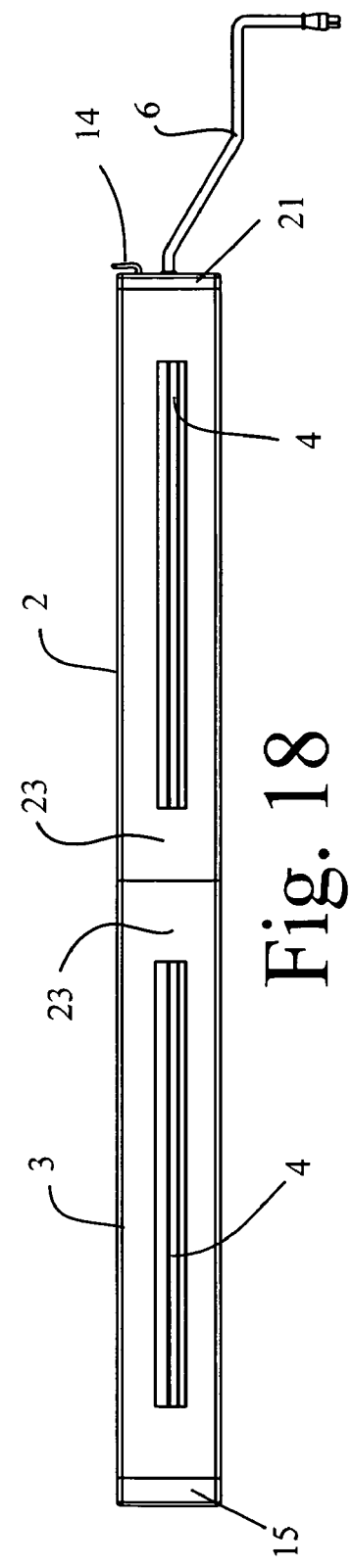

In certain embodiments, as shown in FIGS. 8 and 10, the radiator enhancer 2 preferably includes a crank shaft 18 fitted at one end 39 of the shaft 38 and the variable speed motor 19. Such a crank shaft 18 is rotated in sync with the variable speed motor 19 based upon a control signal received from the control box 20. The shaft 18 rotates along an arcuate path and thereby separately and independently draws in the ambient air through the intake ports 4 while separately and independently discharging the ambient air outwardly through either the fan blade blower 5 or transverse flow blower 13 which is crucial such that heated air is more efficiently dissipated away from the existing baseboard radiator 1. Notably, the rotational power is transferred to the enhancer extension 3 via the coupling 17 cooperating with the fan of the radiator enhancer 2. Notably, air is not transferred between the radiator enhancer and enhancer extension, 2, 3. Thus, air is separately channeled through respective intake and exhaust ports 4, 7 of the radiator enhancer and enhancer extension 2, 3.

Referring to FIGS. 2-3, in another embodiment, the user-operated air-flow regulating device 10 further includes a mechanism 46 for channeling the ambient air along a third travel path 88 leading obliquely away from the second travel path 27. Such an ambient air channeling mechanism 46 includes a attachment 10 having planar front and rear walls 49, 50 contiguously abutted against front and rear walls of the baseboard radiator 1 for cooperating with a deflector 9 to channel ambient air along the third travel path 88. Attachment 10 is removably positioned over the baseboard radiator 1 wherein an open bottom wall of the attachment 10 is in fluid communication with the radiator fins 8.

Attachment 10 further includes a top flap 12 pivotally coupled to a top wall 56 of the attachment 10 for channeling the ambient air upwardly and away from the radiator fins 8. The attachment 10 further includes a plurality of side panels 11 slidably adaptable along respective linear directions defined parallel to a longitudinal length of the baseboard radiator 1 for channeling the ambient air laterally away from the ends of the attachment 10 respectively.

In one embodiment, as shown in FIGS. 1-3 and 5, the radiator enhancer and enhancer extension 2, 3 are seated subjacent to the existing radiator fins 8, and the intake ports 4 are formed in a front wall 25 of the radiator enhancer and enhancer extension 2, 3. In such an embodiment, the fan blade blowers 5 is seated beneath the top wall of the radiator enhancer and enhancer extension 2, 3, and the front and top walls 25, 33 thereof are registered perpendicular to each other along mutually exclusive planes. Notably, air is not transferred between the radiator enhancer and enhancer extension, 2, 3. Thus, air is separately channeled through respective intake and exhaust ports 4, 7 of the radiator enhancer and enhancer extension 2, 3.

In an alternate embodiment, as shown in FIG. 4, the radiator enhancer and enhancer extension 2, 3 are seated directly on the existing radiator fins 8, and the intake ports 4 are formed in a bottom wall of the radiator enhancer and enhancer extension 2, 3. The transverse flow blowers 13 i are seated beneath a top wall 33 of the radiator enhancer and enhancer extension 2, 3, and the front and top walls 25, 33 are registered parallel to each other along mutually exclusive planes. Notably, air is not transferred between the radiator enhancer and enhancer extension, 2, 3. Thus, air is separately channeled through respective intake and exhaust ports 4, 7 of the radiator enhancer and enhancer extension 2, 3.

The device 100 is designed to increase the efficiency and comfort of the typical baseboard radiator 1. It does this by increasing the air flow through the radiator fins 8 of the baseboard radiator 1 and taking advantage of the latent heat in the baseboard radiator 1. The device may be manually or remotely controlled, height adjustable, expandable, portable, variable speed and duration controlled. It may also be powered by AC, DC, or battery.

The present invention 100, as claimed, provides the unexpected and unpredictable benefit of a radiator enhancer and enhancer extension 2, 3 that are convenient and easy to use, is durable in design, is versatile in its applications, and advantageously provides users with considerable energy savings and lower energy bills. The present invention effectively accentuates the benefits of any radiator, making living and working conditions more comfortable and affordable.

In use, a method for regulating air-flow and enhancing heat distribution from an existing baseboard radiator includes the steps of: providing and situating a radiator enhancer and an enhancer extension 2, 3 adjacent to the existing baseboard radiator 1 by orienting the radiator enhancer and enhancer extension 2, 3 at an end-to-end pattern. The radiator enhancer and enhancer extension 2, 3 have top and bottom units 24, 23 removably attached to each other and arranged in such a manner to define a cavity 72 therebetween respectively.

The method further includes the step of separately and independently directing ambient air into the radiator enhancer and enhancer extension cavities 72 such that the ambient air travels along a first travel path 26 respectively. The method further includes the step of separately and independently displacing the ambient air out from the radiator enhancer and enhancer extension cavities 72 and along a second travel path 27 registered along a mutually exclusive plane to the first travel path 26 respectively, based upon a detected heating temperature of the existing radiator fins 8 of the existing baseboard radiator 1.

In use, the method may further include the steps of: providing at least one intake port 4 formed in a wall of the radiator enhancer 2; providing at least one exhaust port 7 formed within another wall 33 of the radiator enhancer 2; providing and mounting a control box 20 within the radiator enhancer cavity 72; providing and seating a variable speed motor 19 within the radiator enhancer cavity 72; communicatively coupling the variable speed motor 19 to the control box 20; providing and electrically coupling a sensor 14 to the control box 20 by extending the sensor 14 outwardly from the cavity 72; adjoining the sensor 14 to the existing radiator fins 8 for detecting a temperature of heat dissipating therefrom; and separately and independently directing the ambient air into the radiator enhancer and enhancer extension cavities 72 via at least one intake port 4 and thereafter separately and independently directing the ambient air out from at least one exhaust port 7 respectively by providing and rotatably disposing a fan within the radiator enhancer cavity 72.

In use, the method may further include the step of channeling the ambient air along a third travel path 88 leading obliquely away from the second travel path by providing an attachment 10 having planar front and rear walls 49, 50. The method further includes the steps of removably positioning the attachment 10 over the radiator fins 8 and baseboard radiator 1 wherein an open bottom wall of the attachment 10 is in fluid communication with the radiator fins 8 and baseboard radiator 1; channeling the ambient air upwardly and away from the radiator baseboard 1 by providing and pivotally coupling a top panel 12 to a top wall 56 of the attachment 10; and channeling the ambient air laterally away from the ends of the attachment 10 by providing and slidably adapting a plurality of side panels 11 along respective linear directions defined parallel to a longitudinal length of the baseboard radiator 1.

In use, the method may further include the steps of: positioning the radiator enhancer and enhancer extension 2, 3 subjacent to the existing radiator fins 8. The intake ports 4 are formed in a front wall 25 of the radiator enhancer and enhancer extension 2, 3. The fan blade blower 5 is seated beneath a top wall 33 of the radiator enhancer and enhancer extension 2, 3, and the front and top walls 25, 33 are registered perpendicular to each other along mutually exclusive planes.

In use, the method may further include the steps of: positioning the radiator enhancer and enhancer extension 2, 3 on the directly on the radiator fins 8. The intake ports 4 are formed in a bottom wall of the radiator enhancer and enhancer extension 2, 3. Such an embodiment employs a transverse flow blower 13 that is oriented parallel with a top wall 33 of the radiator enhancer and enhancer extension 2, 3. Also, the front and top walls 25, 33 are registered parallel to each other along mutually exclusive planes.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A user-operated air-flow regulating device for enhancing heat distribution from an existing baseboard radiator having radiator fins, said user-operated air-flow regulating device comprising: a radiator enhancer adapted to be situated adjacent to the existing baseboard radiator, said radiator enhancer having a top unit and a bottom unit removably attached to each other and arranged in such a manner so as to define a cavity therebetween, means for directing ambient air into said cavity along a first travel path and thereafter displacing the ambient air out from said cavity along a second travel path along a plane which is mutually exclusive with regard to said first travel path, said ambient air directing and displacing means being selectively operable based upon a detected heating temperature of the radiator fins of the existing baseboard radiator; and, said user-operated air-flow regulating device further comprising: means for channeling the ambient air along a third travel path leading obliquely away from said second travel path.

2. The user-operated air-flow regulating device of claim 1, wherein said ambient air directing and displacing means comprises:
   at least one intake port formed in a wall of said air-flow regulating device;
   at least one exhaust port formed within another wall of said air-flow regulating device;
   a fan blade blower rotatably disposed within said cavity and being operated in such a manner that the ambient air is directed into said cavity via said at least one intake port and thereafter directed out from said at least one exhaust port;
   a control box mounted within said cavity;
   a variable speed motor seated within said cavity and operably coupled to said control box; and
   a sensor electrically coupled to said control box and extending outwardly from said cavity, said sensor adjoining existing radiator fins of the existing baseboard radiator for detecting a temperature of heat dissipating therefrom.

3. The user-operated air-flow regulating device of claim 2, wherein said fan blade blower comprises:
   an elongated rectilinear shaft having axially opposed ends situated at opposed ends of said cavity;
   a plurality of brackets fixedly conjoined to said bottom unit and positioned at said opposed ends of said cavity, each of said brackets having an aperture formed therein, said apertures being axially aligned with said shaft such that said opposed ends of said shaft penetrate through said apertures while longitudinally oriented within said cavity respectively;
   a plurality of end caps removably mated with corresponding ends of said top and bottom units in such a manner that said top and bottom units are prohibited from prematurely separating during operating conditions; and
   a crank shaft fitted at one of said opposed ends of said shaft and said variable speed motor, said crank shaft being rotated in sync with said variable speed motor based upon a control signal received from said control box;
   wherein said shaft rotates along an arcuate path and thereby draws in the ambient air through said exhaust ports while discharging the ambient air outwardly through said fan blade blower such that heated air is more efficiently dissipated to said radiator fins.

4. The user-operated air-flow regulating device of claim 1, said ambient air channeling means comprising
   an attachment having planar front and rear walls removably positioned over said existing baseboard existing radiator for cooperating with an existing deflector of the existing baseboard radiator and thereby channeling ambient air along said third travel path, wherein an open bottom wall of said attachment is in fluid communication with the existing radiator fins; and
   a top wall connected to said front and rear walls of said attachment, said top wall including a top flap pivotally coupled thereto for channeling the ambient air upwardly and away from said air-flow regulating device, said attachment further including at least one side panel slidably adaptable along respective linear directions defined parallel to a longitudinal length of the existing baseboard radiator for channeling the ambient air laterally away from opposed ends of said attachment respectively.

5. The user-operated air-flow regulating device of claim 1, wherein said air-flow regulating device is seated subjacent to the existing baseboard radiator;
   wherein said intake ports are parallel with a front wall of said air-flow regulating device, said fan blade blower being seated beneath a top wall of said air-flow regulating device, said front and top walls being registered perpendicular to each other along mutually exclusive planes.

6. The user-operated air-flow regulating device of claim 1, wherein said air-flow regulating device is seated directly on the existing baseboard radiator;
   wherein said intake ports are parallel with a bottom wall of said air-flow regulating device, said transverse flow blower being seated beneath a top wall of said air-flow regulating device, said front and top walls being registered parallel to each other along mutually exclusive planes.

7. A user-operated air-flow regulating device for enhancing heat distribution from an existing baseboard radiator having radiator fins, said user-operated air-flow regulating device comprising: a radiator enhancer and an enhancer extension adapted to be situated adjacent to the existing baseboard radiator and oriented at an end-to-end pattern, each of said radiator enhancer and said enhancer extension having top and bottom units removably attached to each other and arranged in such a manner so as to define a cavity therebetween respectively;

means for directing ambient air into said cavity along a first travel path and thereafter displacing the ambient air out from said cavity along a second travel path along plane which is mutually exclusive with regard to said first travel path, said ambient air directing and displacing means being selectively operable based upon a detected heating temperature of the of the existing baseboard radiator; and a coupling intermediately attached to said radiator enhancer and said enhancer extension respectively; and, said user-operated air-flow regulating device further comprising: means for channeling the ambient air along a third travel path leading obliquely away from said second travel path.

8. The user-operated air-flow regulating device of claim 7, wherein said ambient air directing and displacing means comprises:

at least one intake port formed in a wall of a bottom unit of said radiator enhancer and enhancer extension respectively;

at least one exhaust port formed within another wall of said radiator enhancer and said enhancer extension respectively;

a fan blade blower rotatably disposed within said cavity of said radiator enhancer and being mated to said coupling in such a manner that the ambient is separately directed into said at least one intake port of each of said radiator enhancer and enhancer extension and thereafter directed out from said at least one exhaust port of each of said radiator enhancer and enhancer extension;

a control box mounted within said cavity of said radiator enhancer;

a variable speed motor seated within said cavity of said radiator enhancer and operably coupled to said control box; and a sensor electrically coupled to said control box and extending outwardly from said cavity of said radiator enhancer, said sensor adjoining existing radiator fins of the existing baseboard radiator for detecting a temperature of heat dissipating therefrom.

9. The user-operated air-flow regulating device of claim 8, wherein said radiator enhancer and said enhancer extension are seated subjacent to the existing radiator fins;

wherein said intake ports are formed in a front wall of said radiator enhancer and said enhancer extension respectively, said fan blade flow blower being seated beneath a top wall of said radiator enhancer, said front and top walls being registered perpendicular to each other along mutually exclusive planes.

10. The user-operated air-flow regulating device of claim 8, wherein said radiator enhancer and said enhancer extension are seated directly on the existing radiator fins;

wherein said intake ports are formed in a bottom wall of said radiator enhancer and said enhancer extension respectively, said transverse flow blower being seated beneath a top wall of said radiator enhancer, said front and top walls being registered parallel to each other along mutually exclusive planes.

11. The user-operated air-flow regulating device of claim 8, said ambient air channeling means comprising an attachment having planar front and rear walls removably positioned over said existing baseboard radiator for cooperating with an existing deflector of the existing baseboard radiator and thereby channeling ambient air along said third travel path wherein an open bottom wall of said attachment is in fluid communication with the existing radiator fins; and a top wall connected to said front and rear walls of said attachment, said top wall including a top flap pivotally coupled thereto for channeling the ambient air upwardly and way from the existing radiator fins, said attachment further including at least one side panel slidably adaptable along respective linear directions defined parallel to a longitudinal length of the existing baseboard radiator for channeling the ambient air laterally away from opposed ends of said attachment respectively.

12. The user-operated air-flow regulating device of claim 11, wherein said fan blade blower comprises:

an elongated rectilinear shaft having axially opposed ends situated at opposed ends of said cavity of said radiator enhancer;

a plurality of brackets fixedly conjoined to said bottom unit and positioned at said opposed ends of said cavity of said radiator enhancer, each of said brackets having an aperture formed therein, said apertures being axially aligned with said shaft such that said opposed ends of said shaft penetrate through said apertures while longitudinally oriented within said cavity of said radiator enhancer respectively;

a plurality of end caps removably mated with corresponding ends of said top and bottom units of said radiator enhancer and said enhancer extension in such a manner that said top and bottom units are prohibited from prematurely separating during operating conditions; and a crank shaft fitted at one of said opposed ends of said shaft and said variable speed motor respectively, said crank shaft being rotated in sync with said variable speed motor based upon a control signal received from said control box;

wherein said shaft rotates along an arcuate path and thereby draws in the ambient air through said exhaust ports while discharging the ambient air outwardly through said fan blade blower such that heated air is more efficiently dissipated away from the existing radiator fins.

13. A method for regulating air-flow and enhancing heat distribution from an existing baseboard radiator having radiator fins, said method comprising the steps of:

providing and situating a radiator enhancer and an enhancer extension adjacent to the radiator fins of the the baseboard radiator by orienting said radiator enhancer and said enhancer extension in an end-to-end pattern, said radiator enhancer and said enhancer extension having respective top and bottom units removably attached to each other and arranged in such a manner so as to define a cavity therebetween respectively detecting the temperature of the radiator fins;

directing ambient air into said radiator enhancer and said enhancer extension cavities such that the ambient air travels along a first travel path;

displacing the ambient air out from said radiator enhancer and said enhancer extension cavities and along a second travel path along plane which is mutually exclusive with regard to said first travel path respectively based upon a detected temperature, and, said method for regulating air flow and enchancing heat distribution further comprising the step of: channeling the ambient air along a third travel path leading obliquely away from said second travel path.

14. The method of claim 13, wherein the steps of directing and displaying the ambient air comprise the steps of:
providing at least one intake port formed in a wall of said radiator enhancer and said enhancer extension respectively;
providing at least one exhaust port formed in another wall of said radiator enhancer and said enhancer extension respectively;
providing and mounting a control box within said radiator enhancer cavity;
providing and seating a variable speed motor within said radiator enhancer cavity;
communicatively coupling said variable speed motor to said control box;
providing and electrically coupling a sensor to said control box by extending said sensor outwardly from said cavity;
adjoining said sensor to the existing radiator fins for detecting a temperature of heat dissipating therefrom; and
directing the ambient air into said radiator enhancer and said enhancer extension cavities via said at least one intake port and thereafter separately directing the ambient air out from said at least one exhaust port respectively by providing and rotatably disposing a fan blade blower within said radiator enhancer cavity.

15. The method of claim 14, wherein the step of channeling the ambient air along a third travel path is performed by:
providing an attachment having planar front and rear walls removably positioning said attachment over said baseboard radiator for cooperating with an existing deflector of the existing baseboard radiator and thereby channeling ambient air along said third travel path, wherein an open bottom wall of said attachment is in fluid communication with the existing radiator fins;
providing and connecting a top wall to said front and rear walls of said attachment;
channeling the ambient air upwardly and away from said radiator enhancer and enhancer extension by providing and pivotally coupling a top flap to said top wall of said attachment; and
channeling the ambient air laterally away from opposed ends of said attachment by providing and slidably adapting a plurality of side panels along respective linear directions defined parallel to a longitudinal length of said baseboard radiator.

16. The method of claim 13, further comprising the step of:
positioning said radiator enhancer and said enhancer extension subjacent to the existing radiator fins;
wherein said intake ports are formed in a front wall of said radiator enhancer and said enhancer extension respectively, said fan blade blower seated beneath a top wall of said radiator enhancer, said front and top walls being registered perpendicular to each other along mutually exclusive planes.

17. The method of claim 13, further comprising the step of:
positioning said radiator enhancer and said enhancer extension directly on the existing radiator fins;
wherein said intake ports are formed a bottom wall of said radiator enhancer, said transverse flow blower being seated beneath a top wall of said radiator enhancer, said front and top walls being registered parallel to each other along mutually exclusive planes.

* * * * *